(12) United States Patent
Patton

(10) Patent No.: US 8,082,647 B2
(45) Date of Patent: Dec. 27, 2011

(54) METHOD FOR DETERMINING THE OPTIMAL INSERTION FORCE OF A FASTENER PRESS

(75) Inventor: Roger B. Patton, North Wales, PA (US)

(73) Assignee: PEM Management, Inc., Wilmington, DE (US)

(*) Notice: Subject to any disclaimer, the term of this patent is extended or adjusted under 35 U.S.C. 154(b) by 576 days.

(21) Appl. No.: 12/208,820

(22) Filed: Sep. 11, 2008

(65) Prior Publication Data
US 2009/0070978 A1 Mar. 19, 2009

Related U.S. Application Data

(60) Provisional application No. 60/972,447, filed on Sep. 14, 2007, provisional application No. 60/972,436, filed on Sep. 14, 2007.

(51) Int. Cl.
*B23Q 17/00* (2006.01)
*G01L 1/00* (2006.01)
(52) U.S. Cl. ............... 29/407.08; 29/407.05; 29/407.01; 29/525.01; 227/2; 73/789; 73/760; 73/791
(58) Field of Classification Search ............... 29/407.08, 29/407.05, 407.09, 407.01, 525.01, 525.06; 227/2, 77, 107; 73/760, 761, 781, 783, 789, 73/791
See application file for complete search history.

(56) References Cited

U.S. PATENT DOCUMENTS

| | | | |
|---|---|---|---|
| 2,325,508 A | 7/1943 | Haas et al. | |
| 4,163,311 A | 8/1979 | Sigmund | |
| 4,233,721 A | 11/1980 | Eshghy | |
| 4,244,245 A | 1/1981 | Wallace et al. | |
| 4,619,396 A | 10/1986 | Yamamoto | |
| 5,281,059 A | 1/1994 | Stuckle | |
| 5,398,537 A | 3/1995 | Michalewski | |
| 5,492,185 A | 2/1996 | Schoeps | |
| 5,526,669 A | 6/1996 | Gjovik | |
| 5,655,289 A | 8/1997 | Wille | |
| 5,813,110 A | 9/1998 | Arntson et al. | |

(Continued)

FOREIGN PATENT DOCUMENTS

EP 738551 A2 * 10/1996

OTHER PUBLICATIONS

Improving the Prediction of the Roll Separating Force in a Hot Steel Finishing Mill (Frayman et al.).*

*Primary Examiner* — Essama Omgba
(74) *Attorney, Agent, or Firm* — Gore & Associates, PLLC

(57) ABSTRACT

Force data is monitored by a strain gauge during a preparatory setup operation of an insertion process during which a sample fastener is installed into a host material by a fastener press. Mathematical algorithms are utilized to determine an optimal insertion force, while a predetermined insertion velocity is maintained throughout the installation process regardless of the force required. With the ram velocity held constant, the insertion force is measured during the installation process and compared to the elapsed time to obtain a force slope. A data point on the force slope which corresponds to the point at which the force slope abruptly increases is captured and recorded as the optimal insertion force. This optimal force is then used by the press for all fasteners/host-material installations of the sample type.

7 Claims, 4 Drawing Sheets

U.S. PATENT DOCUMENTS

| | | |
|---|---|---|
| 5,956,251 A | 9/1999 | Atkinson et al. |
| 6,067,696 A * | 5/2000 | Cecil et al. ............. 29/407.01 |
| 6,240,613 B1 | 6/2001 | O'Connor |
| 6,276,050 B1 | 8/2001 | Mauer et al. |
| 6,325,584 B1 * | 12/2001 | Marko et al. ............. 411/501 |
| 6,851,167 B2 | 2/2005 | Harlow et al. |
| 7,043,808 B2 | 5/2006 | Patton |
| 7,536,764 B2 * | 5/2009 | Weeks et al. ............. 29/407.08 |
| 7,673,377 B2 * | 3/2010 | Clew ............. 29/407.1 |
| 7,679,730 B2 * | 3/2010 | Takano et al. ............. 356/32 |
| 7,788,780 B2 * | 9/2010 | King ............. 29/243.523 |
| 7,797,126 B2 * | 9/2010 | Wenzel et al. ............. 702/158 |
| 7,905,127 B2 * | 3/2011 | Zdravkovic et al. ............. 72/20.1 |
| 2002/0166221 A1 * | 11/2002 | Clew ............. 29/407.02 |
| 2006/0191120 A1 * | 8/2006 | Weeks et al. ............. 29/407.08 |
| 2008/0223894 A1 * | 9/2008 | Cruise et al. ............. 227/2 |
| 2008/0223896 A1 * | 9/2008 | King ............. 227/2 |

* cited by examiner

METHOD FOR DETERMINING THE OPTIMAL INSERTION FORCE OF A FASTENER PRESS

RELATED APPLICATION

This patent application is related to co-pending patent application Ser. No. 12/207,925 entitled "Dual Force Ram Drive for a Screw Press" filed Sep. 10, 2008, provisional patent application Ser. No. 60/972,436 entitled "Setup System for a Fastener Press" filed on Sep. 14, 2007 and provisional patent application Ser. No. 60/972,447 entitled "Dual Force Ram Drive for a Screw Press" filed on Sep. 14, 2007, priority from which is hereby claimed.

FIELD OF THE INVENTION

This invention relates to a fastener press which utilizes electric servo motors for precise ram position control. More specifically, it relates to an automated system for determining the optimal insertion force for a given installation of a clinch fastener.

BACKGROUND OF THE INVENTION

Clinch fasteners have two primary features related to their retention in the host material, usually metal sheets. They are displacers and undercuts. Installing clinch fasteners into host materials is a process of pressing the fasteners' displacers into the host material. The displaced volume of the host material is then by default pushed into the undercut of the clinch fastener thus retaining it in the sheet. Pressing clinch fasteners into host materials requires different forces during the pressing process due to the geometry of the fasteners' displacers. During the pressing process the force required varies but when seated properly there is an instant and abrupt rise in the force required to continue pressing. If the force is increased beyond the point of proper insertion, over-insertion results and the effect is usually a distortion of the clinch fastener and/or the host material. If the pressing force is insufficient then under-installing is the result and typically the clinch fasteners' retention values are diminished.

Currently, selecting the correct insertion force for a clinch fastener is limited to two options. The first option is selecting a force from a table of forces grouped into categories of fastener size, type, and the type of host material the fastener is to be inserted into. These categories are broad generalizations and only provide an estimated force. This estimated force is considered a baseline to work from and the ideal force is then arrived at by trial and error. The trial and error method consists of pressing to a pre-chosen force and then adjusting that force on subsequent insertions to determine the optimal force. The second method of determining the proper insertion force is to bring the ram into contact with a properly positioned fastener on the host sheet and then incrementally increasing the force until the desired insertion results are achieved. Again, this usually involves a measure of trial and error to achieve desirable results and requires considerable operator skill if it is to be carried out quickly and efficiently. This makes the second method relatively expensive. Regardless of which method is used, the optimal force is then recorded and all subsequent fastener installations in that batch are installed to that force.

There is therefore a need in the art for a reliable system for determining proper insertion force in a fastener press which is accurate and reliable. There is a further need for an accurate and reliable proper-insertion-force determination process which may be carried out in automated fashion so that minimal operator skill is required.

SUMMARY OF THE INVENTION

To satisfy the need in the art, the present invention has been devised which eliminates the need for categorized forces and also eliminates the need for trial and error to determine the proper insertion force. In conjunction with servo technology used in electro-mechanical linear actuators and a force-measuring device such as a strain gauge, data about an insertion is monitored during the insertion process. By means of mathematical algorithms the optimal insertion force is determined during a preparatory setup operation in which a sample fastener is installed by a fastener press as specified. Such a press is, for example, a Pemserter Series 3000 manufactured and sold by Penn Engineering and Manufacturing Corp. as shown in FIG. 1 which is a ram press 4 that includes a c-shaped frame 1 that supports an anvil 2 that is reciprocally impacted by ram 3.

More specifically, the Applicant has invented a method for determining the optimal insertion force for installing a clinch-type fastener into a host material comprising the steps of selecting a sample fastener from a work batch of fasteners all of the same type and then monitoring the time, insertion velocity and insertion force of the fastener into a host material during a setup operation of the press. Setup operation includes selecting an insertion velocity to maintain throughout the installation process regardless of the force required. Next, the setup operation is carried out measuring the force required during the installation process to maintain the selected insertion velocity. During the process, the insertion force is compared to the elapsed insertion time to obtain a force slope. The point at which the force slope abruptly increases is recorded and then used as the installation force of the other fasteners in the work batch.

It is therefore the object of the present invention to provide a fastener insertion press with an automated process for determining the proper insertion force for fasteners which can be applied to most any fastener/host material combination. It is a further object of the invention to provide an automated insertion-force determination system which can be carried out quickly and efficiently by a relatively unskilled operator.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

A setup installation is performed during which the desired fastener is inserted into the host panel. The setup installation is carried out at slower than normal work speed so that the proper insertion force value can be more precisely determined. The optimal insertion force for subsequent fastener installations of a work batch is determined during this installation as follows:

(1) First, the insertion velocity is predetermined and then monitored during the insertion process to assure that the velocity is maintained regardless of the force required to maintain the velocity.

(2) Secondly, the force required to maintain the velocity is monitored during the insertion process.

(3) Thirdly, time in milliseconds is monitored during the insertion process. During the insertion, the force-rise over time (slope) varies depending upon the resistance of the pressing action.

(4) Fourthly, this force slope is monitored and a mathematical algorithm is applied to the data points as they are being monitored. A rolling slope average is obtained by averaging the most current 3 force values then also averaging the $6^{th}$, $7^{th}$ and $8^{th}$ values. Once the average is calculated, they are treated as two points then the difference is found and used to calculate a running slope average. This process eliminates or masks data anomalies thus generating a curve that can be interpreted without distortions.

(5) Fifth, when a predetermined amount of consecutive averaged points indicate an abrupt increase of the force slope this data point is interpreted as a properly seated fastener at this force magnitude.

(6) Finally, this force value is then captured and recorded to be used as the desired installation force to be applied with all subsequent fastener installations in the work batch.

Figure 1:
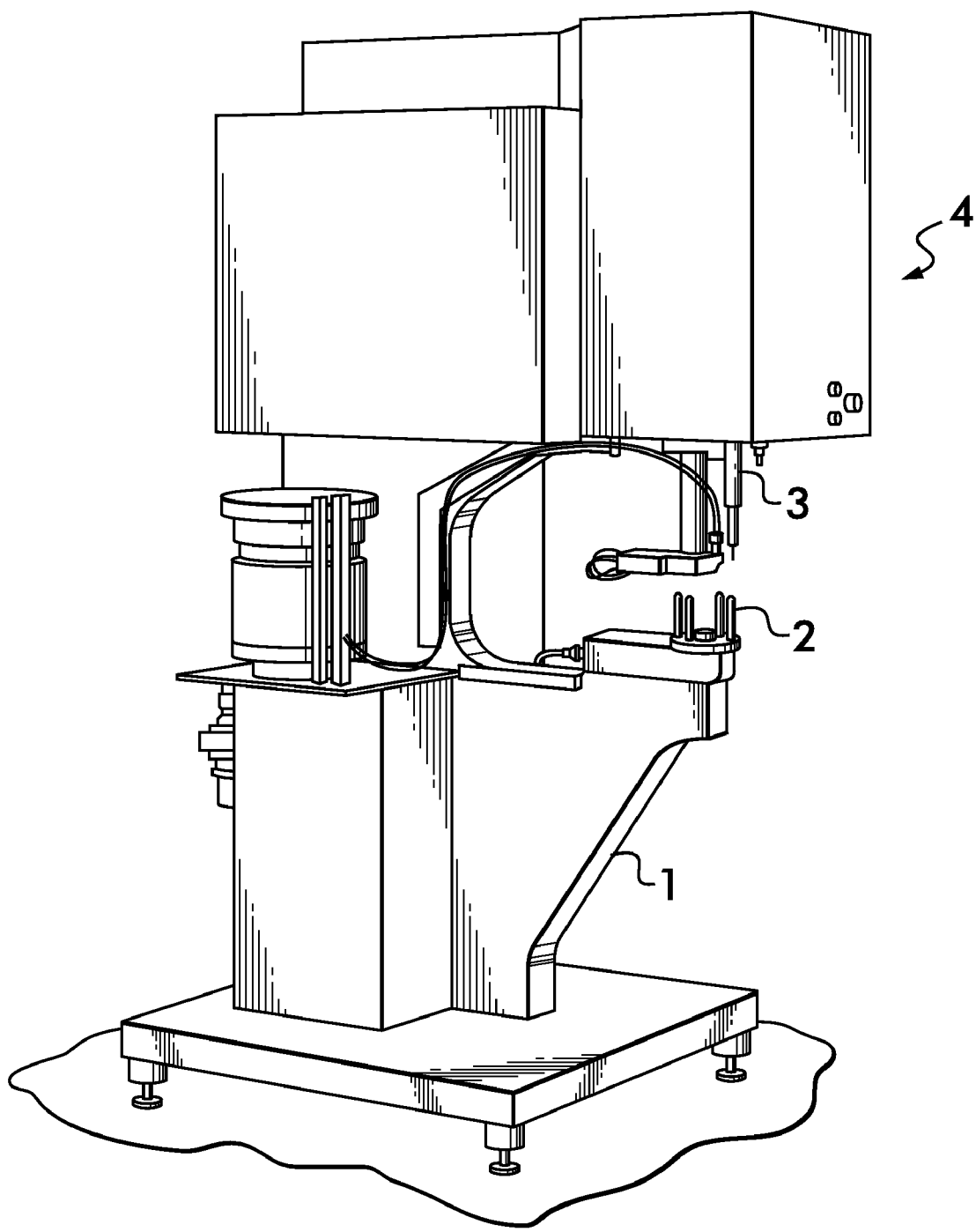
FIG. 1 is a front left isometric view of a ram press utilizing the invention.
Figure 2A:
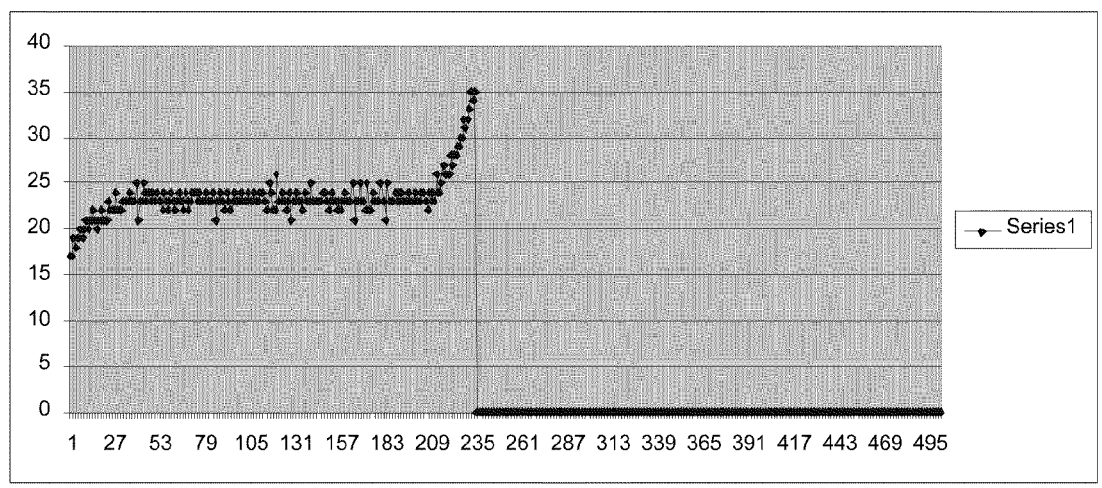
FIGS. 2a and 2b are graphs showing the force and velocity insertion profiles which utilize the invention of the preferred embodiment.

The following illustrations specifically exemplify one embodiment of the above-described methodology of determining the optimal insertion force for a given fastener/host combination. Referring now to FIG. 2a, a graph depicts one way of installing a clinch nut. It shows force over time. The X axis is milliseconds X 10. The Y axis indicates the voltage readout of the strain gauge which equates to force. The data points indicate the strain gage voltage at a given time during the pressing operation. Depicted are extraneous points from the mean. The rolling average smooths out the curve and eliminates erroneous interpretations of the data. The rolling average is a basic mathematical convention used at this time. More sophisticated formulas can be used.

The first part of the graph shows a rise in force as the clinch features are being pressed into the host material. At approximate 350 milliseconds the force curve flattens out. This is due to the geometry of the displacers and the initial deformation of the host material. From 350 milliseconds to approximately 2,150 milliseconds the flat curve represents a fairly constant force is needed to press the displacers into the host material as initial deformation has already occurred and the displacer geometry in now constant. At approximately 2,150 milliseconds the force curve slopes up distinctly. This corresponds to the fastener being seated. At 2,350 milliseconds the process is complete as 5 consecutive averaged points have been recorded on this steep slope.

Figure 2B:
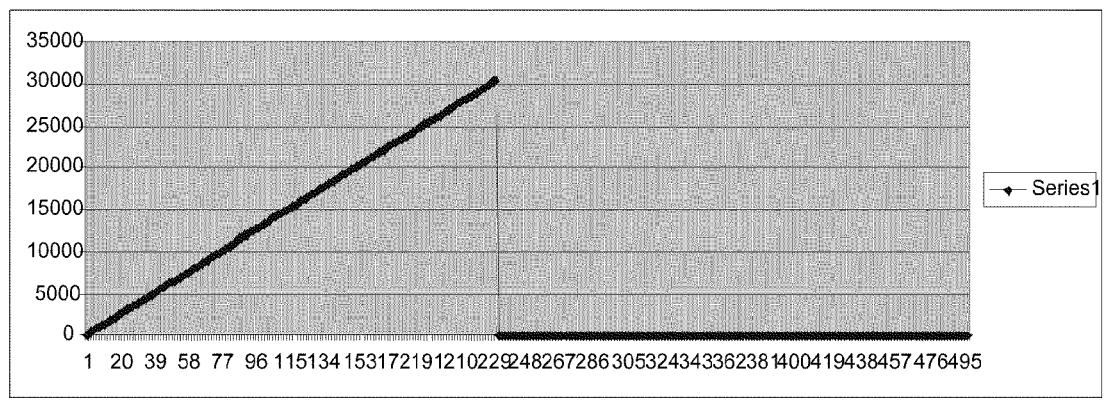
Figure 3A:
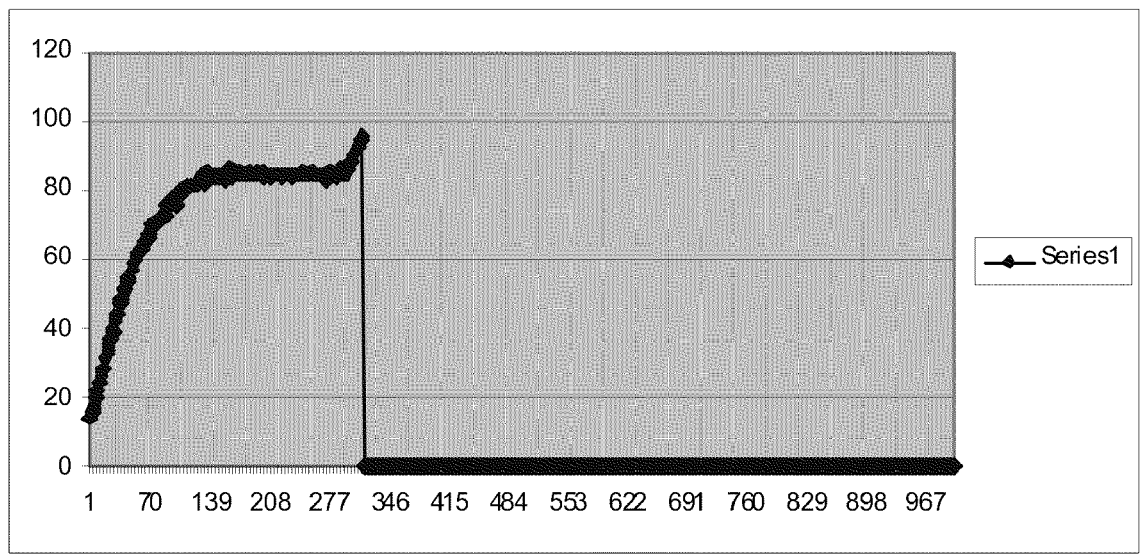
FIGS. 3a and 3b are force and velocity insertion profiles of an alternate fastener/host material combination.
Figure 3B:
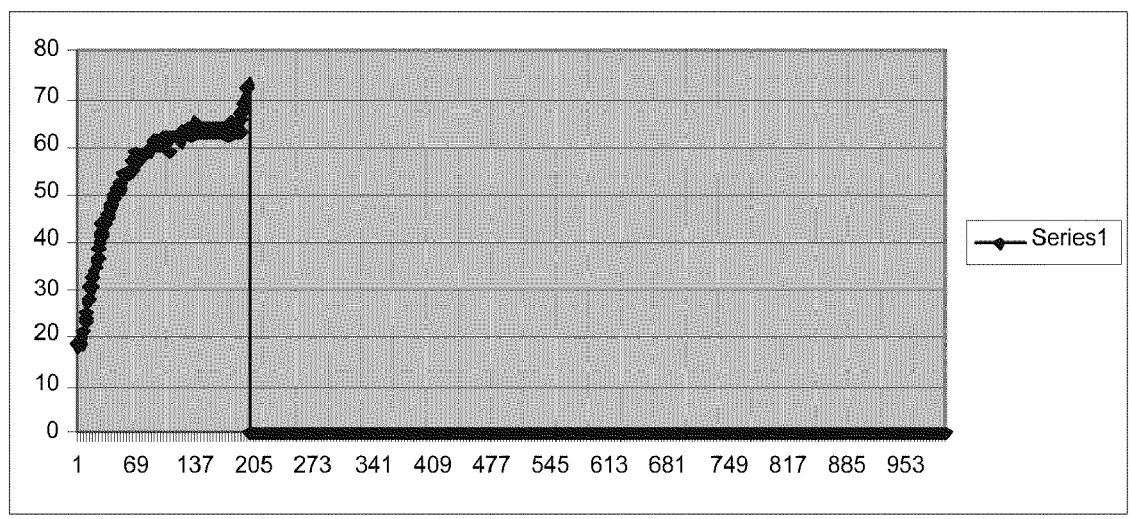
Figure 4A:
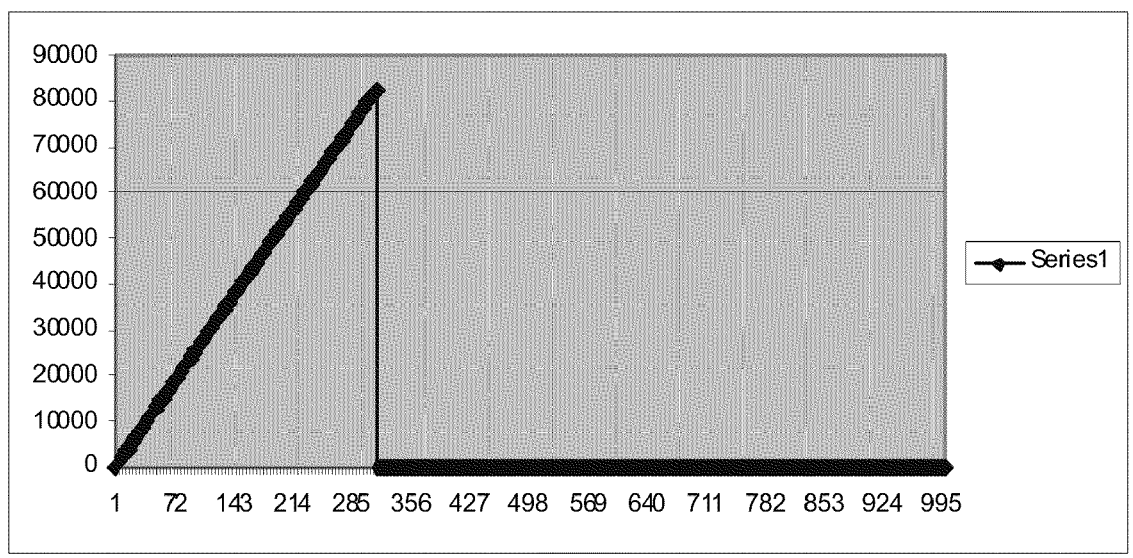
FIGS. 4a and 4b are graphs of the force and velocity insertion profiles of a second alternate fastener/host material combination.
Figure 4B:
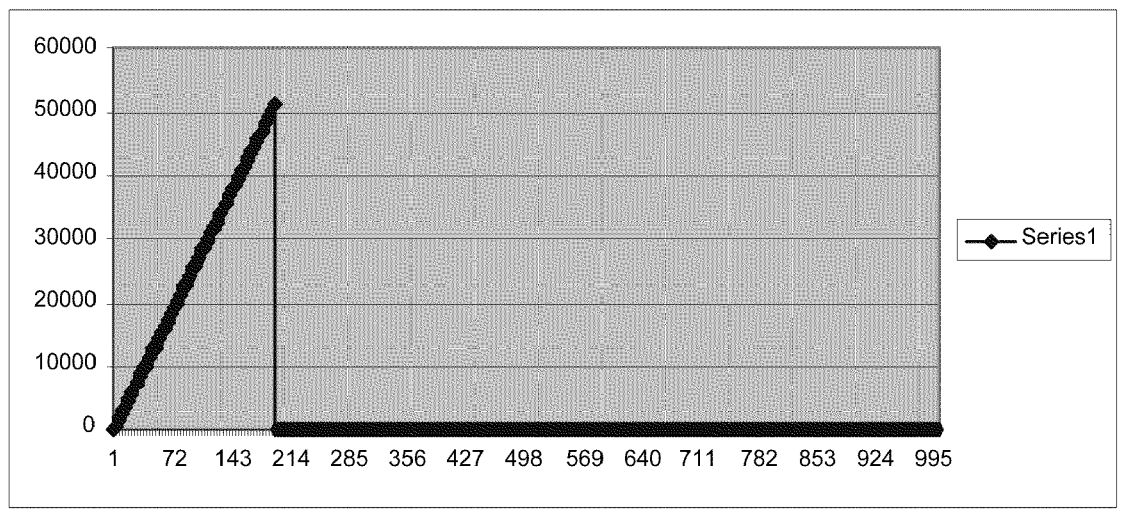

FIG. 2b is a graph associated with FIG. 2a and is recorded simultaneously with FIG. 2a. FIG. 2b shows the velocity of the press ram. The X axis indicates milliseconds X 10 and the Y axis indicates encoder ticks which equate to position. This graph shows that the ram was moving at a constant velocity during the pressing cycle. This information is critical to the inventive process. If the velocity had not been constant then the interpretation of FIG. 2a would be invalid as fluctuations in velocity would have an impact on the force required during the pressing operation.

Various force curves are observed during the pressing of different types of clinch fasteners into various host materials such as CRS, aluminum, or stainless steel sheets. However, the abrupt change in slope indicating a properly seated clinch fastener is constant. The following graphs, 3a, 3b, 4a and 4b depict some more examples of various clinch fastener installations.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for first determining the optimal insertion force for installing clinch fasteners into a deformable host material, comprising the steps of:
   selecting a sample fastener from a work batch of said fasteners all of the same type;
   monitoring the time, insertion velocity and insertion force of said fastener into a host material as it is deformed during a setup test run of a fastener press, comprising the steps of:
      selecting a constant insertion velocity to be maintained throughout the installation process regardless of the force required;
      applying an insertion force through a force range;
      measuring the force required during the installation process to maintain the selected insertion velocity;
      comparing the insertion force throughout said setup force range to the elapsed insertion time to obtain a force slope;
      capturing a data point force on the force slope at which the force slope abruptly increases; and
      recording the data point force as the optimal attachment force;
   installing the other fasteners of the work batch into the same type of host material while continuously monitoring the insertion force; and
   stopping the installation process of each of the other fasteners when the insertion force is observed to equal to the data point force.

2. The method of claim 1 wherein said force slope is a rolling force average.

3. The method of claim 2 wherein said rolling force average is obtained by the difference of the current three force values and the average of the sixth, seventh and eighth observed values.

4. The method of claim 1 wherein said force is measured using a strain gauge.

5. The method of claim 1 wherein said fastener is a clinch nut.

6. The method of claim 1 wherein host material is from the group consisting of CRS, aluminum and stainless steel.

7. A method of finding an unknown optimal clinch insertion force of a clinch fastener installed into a deformable host material by a fastener press comprising:

initiating a test installation on a fastener wherein a pressing force is applied to said fastener and a host material is deformed thereby throughout a force range;

maintaining a constant velocity of the fastener as it is installed;

measuring the pressing force throughout said pressing force range to obtain a force slope; and recording a data point force on the force slope at which the force slope abruptly increases as the force continues to rise, said data point force being the optimal clinch insertion force.

* * * * *